(12) United States Patent
Henderson et al.

(10) Patent No.: US 6,851,702 B2
(45) Date of Patent: Feb. 8, 2005

(54) MOUNTING ASSEMBLY FOR INFLATABLE CURTAIN

(75) Inventors: David Henderson, Ogden, UT (US); Kurt Petersen, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 125 days.

(21) Appl. No.: 09/942,244

(22) Filed: Aug. 29, 2001

(65) Prior Publication Data

US 2003/0042712 A1 Mar. 6, 2003

(51) Int. Cl.[7] .............................................. B60R 21/16
(52) U.S. Cl. ............................ 280/728.2; 280/730.2; 280/749; 384/296; 403/164; 411/356; 411/363
(58) Field of Search .......................... 280/728.1, 728.2, 280/730.2, 749; 403/60, 164; 411/356, 360, 363; 248/222.13, 222.51, 222.11; 384/296

(56) References Cited

U.S. PATENT DOCUMENTS

| | | | | |
|---|---|---|---|---|
| 4,480,853 A | * | 11/1984 | Ando et al. ................. | 280/808 |
| 5,096,224 A | * | 3/1992 | Murakawi et al. ........... | 280/808 |
| 6,113,146 A | * | 9/2000 | Mautsch et al. ............. | 280/808 |
| 6,179,324 B1 | | 1/2001 | White | |
| 6,530,594 B1 | * | 3/2003 | Nakajima et al. ......... | 280/730.2 |
| 6,540,251 B1 | * | 4/2003 | LeVey et al. ............. | 280/728.2 |
| 6,616,179 B2 | * | 9/2003 | Tanase et al. ............. | 280/730.2 |

FOREIGN PATENT DOCUMENTS

WO    WO 01/32474 A2    8/2000

* cited by examiner

Primary Examiner—Eric Culbreth
(74) Attorney, Agent, or Firm—Sally J. Brown

(57) ABSTRACT

A novel mounting bracket for an inflatable curtain is described. The mounting bracket includes a pair of attachment plates for engaging respective sides of the inflatable curtain. One plate includes an opening through which a fastener may be positioned to secure the bracket and attached inflatable curtain to the interior of a vehicle. A bushing having an inner surface and an outer surface is positioned within the opening in the mounting plate. Flanges extending from an outer surface of the bushing maintain the bushing within the opening. The outer surface of the bushing is smaller than the opening which allows the bushing to rotate freely within the bracket when a fastener is used to secure the mounting bracket to the interior of a vehicle.

45 Claims, 5 Drawing Sheets

MOUNTING ASSEMBLY FOR INFLATABLE CURTAIN

BACKGROUND OF THE INVENTION

1. Field of the Invention

The present invention relates to a system for mounting an inflatable curtain within a vehicle. More specifically, the present invention relates to a freely rotating mounting assembly for attaching an inflatable curtain to the interior side frame of a vehcle.

2. Technical Background

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of an explosive charge contained within an inflator. Expanding gases from the charge travel through conduits and fill the airbags, which immediately inflate in front of the driver and passenger to protect them from harmful impact with the interior of the car. Airbag systems have also been developed in response to the need for similar protection from lateral impacts between a passenger and the side of a vehicle's interior. This might occur when another vehicle collides with the side of the car, or in a rollover situation where the side of car is repeatedly impacting the ground.

Side impact airbag systems are designed to prevent the head of a vehicle occupant from emerging through the window opening or from colliding with the reaction surface at the side of the vehicle. Side impact airbags have a smaller area in which to deploy and must be configured to inflate efficiently and in the right direction. There is also less space in which to install side impact airbags. Side inflatable airbag curtains are typically attached to the roof rail of a car behind the head liner. The roof rail is the metal portion of the car frame which extends along the side of the car at the junction of the side doors and the roof. The head liner is an interior component which covers the roof rail at the door seal.

Side airbag modules typically include an inflatable curtain folded into a predetermined configuration and then placed in a covering, wrap, or housing. Most side airbag modules include an attachment means for securing the airbag module to the roof rail. When the airbag curtain is in a folded state, the airbag module is long, narrow, and flexible. The problem with most side impact air modules is that their long and narrow configuration makes them awkward and cumbersome to install. The folded airbag must be positioned next to the roof rail or other frame member to which it will be attached. Often times the installer needs both hands to align the somewhat flimsy folded airbag and module with the curved or twisted roof rail. This makes it extremely difficult if not impossible for the installer to operate the tool used to mount the airbag curtain to the vehicle. Sometimes this problem is overcome by using separate positioning equipment such as sophisticated mounting jigs, or using multiple people to hold the inflatable curtain in place during installation. Unfortunately, the use of additional equipment, tools, or human resources drives up the cost of installation.

Another problem with installing inflatable airbag curtains with existing mounting brackets is that the torque of the installation tools transfers to the mounting bracket and the airbag curtain causing it to twist and crimp which can negatively affect the folded configuration of the airbag curtain. Furthermore, an additional installer may be necessary to hold the airbag curtain to keep it from rotating while another installer secures the airbag curtain to the vehicle.

One attempt to solve these current problems is to configure the mounting brackets with hooks that can be placed into a special slot in the vehicle body. The hooks hold the inflatable curtain in place while installers bolt or otherwise secure that assembly to the vehicle. The hooks also help to keep the mounting brackets from rotating. However, these hooks suffer many disadvantages. The hooks require special notches in the vehicle to receive the hooks of the mounting bracket. Additionally, the hooks do not prevent the torque from transferring to the mounting bracket. Thus, the torque of the connection can transfer to the hooks making them susceptible to bending or twisting. This unwanted deformation can call into question the integrity of the mount. Further, the torque of the installation tool can cause the hook to disengage the slot. Still further, the use of mounting brackets with hooks involves multiple installation steps. The inflatable curtain must be hooked to the vehicle which requires alignment of the hooks within notches in the vehicle before the inflatable curtain can be secured to the vehicle. This drives up installation time and costs.

Another disadvantage of known airbag curtain mounting systems is that the attachment points for the airbag curtain are susceptible to slight rotations, even with the hooks. When these points of attachment are cinched tight with a slight rotation, the deployment of the airbag can be negatively affected. Specifically, the pressure or force caused by the inflating airbag may not be evenly distributed over all the points of attachment. Thus, the airbag may be susceptible to tearing at the point of attachment bearing an unequal amount of force.

Accordingly, it would be an advancement in the art to provide a mounting bracket for an inflatable curtain which allows the installer to secure the inflatable curtain to the interior of a vehicle without the need for extra tools, equipment, or human resources. It would also be an advancement to provide such an airbag curtain module that did not require the extra installation time of aligning the mounting bracket within a notch in the vehicle. It would further be an advancement to provide such a mounting bracket for an inflatable curtain that did not transfer the torque of the installation tool to the inflatable curtain. It would be yet another advancement to provide such a mounting bracket for an inflatable curtain that would evenly distribute the deployment forces caused by the inflating inflatable curtain. It would be yet another advancement to provide such a mounting bracket for an inflatable curtain that was less expensive and easier to install.

Such a mounting bracket for an airbag curtain is disclosed and claimed herein.

BRIEF SUMMARY OF THE INVENTION

The apparatus of the present invention has been developed in response to the present state of the art, and in particular, in response to the problems and needs in the art that have not yet been fully solved by currently available airbag curtain mounting brackets. Thus, it is an overall objective of the present invention to provide a freely rotatable mounting bracket.

To achieve the foregoing advancements, and in accordance with the invention as embodied and broadly described herein in the preferred embodiment, a mounting bracket for an inflatable curtain that allows free rotation of a fastener within the bracket is provided. The bracket includes an attachment plate for engaging the inflatable curtain. The attachment plate defines an opening in which a bushing is placed. A fastener may be positioned within the bushing to attach the mounting bracket and attached inflatable curtain to the interior of a vehicle.

In one embodiment, a pair of attachment plates are configured to engage respective opposing surfaces of the inflatable curtain. Each plate defines an opening. The openings are substantially aligned with each other to permit the positioning of a fastener through the aligned openings. A first attachment plate includes at least one, and in one embodiment, multiple locking tabs extending from an attachment surface of the first attachment plate. A second attachment plate is configured with receiving orifices for receiving the corresponding locking tabs. With the locking tabs positioned within the receiving orifices, the inflatable curtain is captured by the mounting bracket. Each attachment plate has a first edge at which the attachment plates are connected to each other. In one embodiment, the attachment plates are integral with each other and folded such that the attachment plates are adjacent to each other with the respective openings in each plate substantially aligned.

A bushing is in rotatable communication with the attachment plate adjacent the opening. The bushing may include an inner surface and an outer surface. Where the mounting bracket includes a pair of mounting pates, the bushing is positioned within the aligned openings of the attachment plates. The outer surface of the bushing comprises a diameter smaller than the opening of the attachment plate. Thus, the bushing may rotate freely within one or more attachment plates of the mounting bracket. Consequently, when a fastener such as a screw or bolt is positioned within the bushing to secure the mounting bracket and attached inflatable curtain to the interior of a vehicle, the torque applied to the fastener during installation does not transfer to the bracket or curtain. The bushing may also include flanges which help maintain the bushing within the attachment plate opening.

The bushing may be deformable to facilitate the positioning of the bushing within the attachment plate. In one embodiment, the bushing includes one or more protrusions positioned at the inner surface of the bushing. The protrusions facilitate the frictional engagement of a fastener with the bushing. Thus, the mounting bracket is easily and efficiently installed.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

Figure 1:
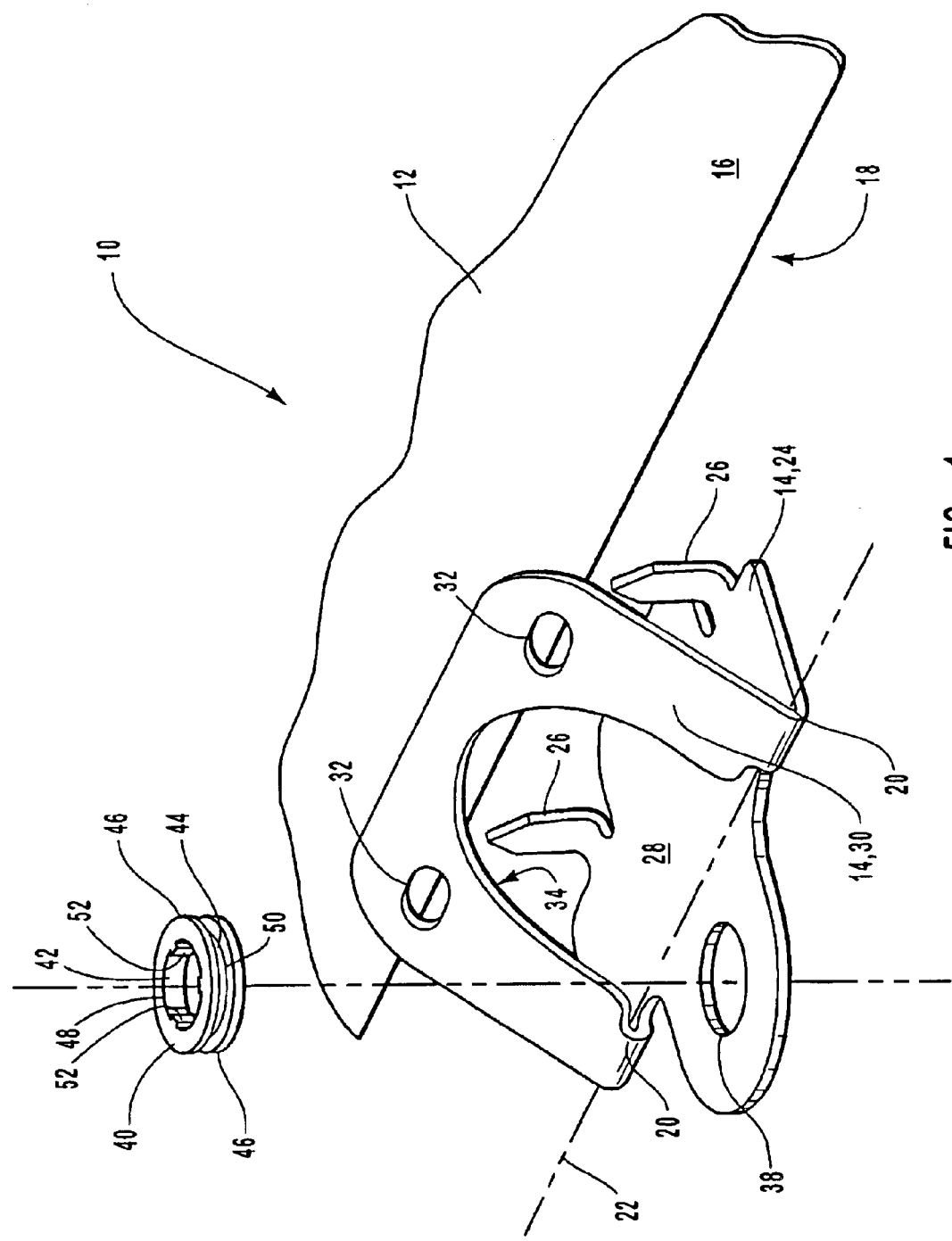
FIG. 1 is an exploded perspective view of a mounting bracket according to the present invention.

With particular reference to FIG. 1, a mounting bracket is generally designated at 10. The mounting bracket 10 is particularly well-suited for engaging an inflatable curtain 12 to facilitate securing the curtain 12 to the interior of a vehicle. The mounting bracket 10 includes at least one attachment plate 14. In one embodiment, a pair of attachment plates 14 are configured for engaging respective opposing surfaces 16, 18 of the inflatable curtain 12. Each attachment plate 14 may include a first edge 20. In the embodiment illustrated in FIG. 1, the first edges 20 of the attachment plates 14 are integral with each other. In this configuration, the attachment plates 14 are formed from a unitary piece, folded at a single fold line 22. In alternative embodiments, separate attachment plates 14 may be attached to each other in various ways, including, but not limited to welding, bonding, bolting, riveting, and the like.

A first attachment plate 24 may include one or more locking tabs 26 extending from an attachment surface 28 of the first attachment plate 24. A second attachment plate 30 may include one or more receiving orifices 32 configured within an attachment surface 34 of the second attachment plate 30. Each receiving orifice 32 is configured to receive a corresponding locking tab 26. The inflatable curtain 12 may also be configured with openings (not shown) through which the locking tabs 26 may be positioned. The locking tabs 26, when positioned within the receiving orifices 32, may be bent over to secure the inflatable curtain 12 within the mounting bracket 10. It will be appreciated by those of skill in the art that the attachment plates 14 may be configured to capture the inflatable curtain 12. The inflatable curtain 12 may also be secured to the mounting bracket 10 in a variety of ways, including, but not limited to latching, crimping, bonding, and the like. As will be discussed in greater detail below, the attachment plates 14 may include a variety of spaced indentations to facilitate the clamping of the attachment plates 14 onto the inflatable curtain 12 (see FIG. 5).

At least one of the attachment plates 14 includes an opening 38 configured to receive a bushing 40. The bushing 40 may include an inner surface 42 and an outer surface 44. As will be discussed in greater detail below, the outer surface 44 of the bushing 40 loosely engages the opening 38 to allow free rotation of the bushing 40 within the mounting bracket 10. In the illustrated embodiment, the opening 38 is configured within the first attachment plate 24. The bushing 40 may include a flange 46, which extends radially from the outer surface 44 of the bushing 40. In one embodiment, a pair of flanges 46 extend radially outward from the outer surface 44 of the bushing 40 at a first end 48 and a second end 50 of the bushing 40. The flanges 46 help to retain the bushing 40 within the opening 38 in the first attachment plate 24. The bushing 40 may include one or more protrusions 52 which extend from the inner surface 42 of the bushing. In one embodiment, three protrusions 52 are spaced about the inner surface 42, extending from the first end 48 of the bushing 40 to the second end 50 of the bushing 40. The protrusions 52 provide a raised surface which may frictionally engage a fastener (FIG. 2) to help retain the fastener within the bushing 40.

Figure 2:
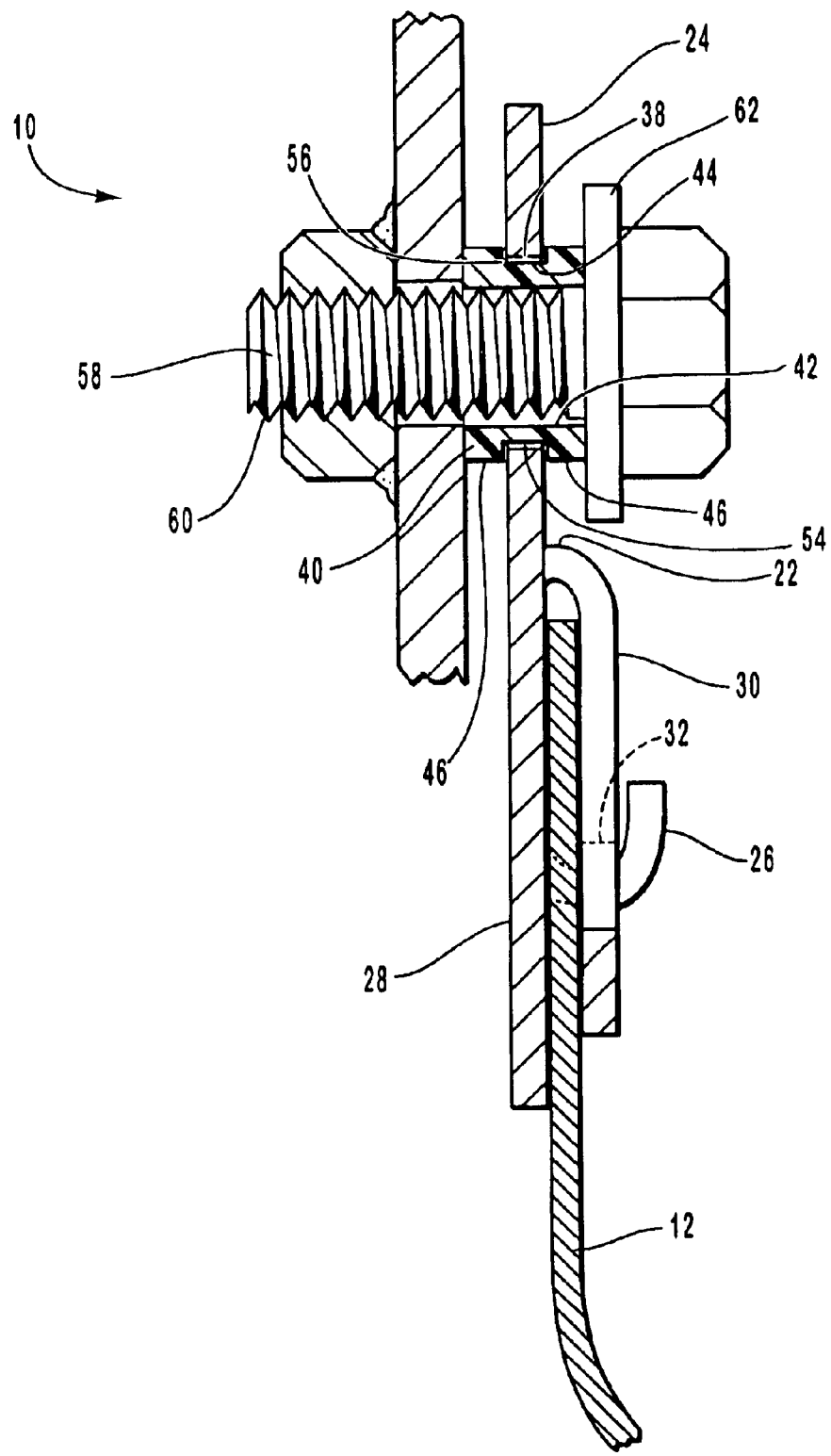
FIG. 2 is a side cross section view of the mounting bracket of FIG. 1.

Referring now to FIG. 2, a cross section of the mounting bracket 10, according to the teachings of the present invention is shown. The bushing 40 is in rotatable communication with the first attachment plate 24 adjacent the opening 38. The diameter of the outer surface 44 of the bushing 40 is less than the diameter of the opening 38. Accordingly, an annular gap 54 exists between the bushing 40 and the first attachment plate 24. Thus, any torque applied to the bushing 40 during installation of the curtain 12 into a vehicle, will not transfer to the remainder of the bracket 10.

The outer surface 44, together with the flanges 46 form an annular channel 56 in which the first attachment plate 24 is seated. The diameter of each flange 46 is slightly greater than the diameter of the opening 38 which allows the bushing 40 to be retained within the first attachment plate 24. In one embodiment, the bushing 40 is made of plastic and is deformable. In this configuration, the bushing 40 can be press fit into the opening 38 of the first attachment plate 24.

The bushing 40 is configured to receive a fastener 58. The fastener 58 may be configured with threads 60 to facilitate attachment of the fastener 58 to the interior of a vehicle. The fastener 58 includes a head 62 which is larger than the diameter of the inner surface 42 of the bushing 40. This allows the fastener 58 to retain the mounting bracket 10 in close proximity to the interior of the vehicle. In one embodiment, the fastener 58 is affixed or attached to the inner surface 42 of the bushing 40. This can be accomplished by press fitting, swage fitting, or other frictional coupling, or by bonding, welding or the like. In one embodiment, the fastener 58 and bushing 40 may be molded into one integral piece. It will be appreciated by those of skill in the art that a variety of fasteners 58 may be used to practice the teachings of this invention, including, but not limited to, bolts, screws, rivets, pins, and the like.

The bracket 10 may be made of sheet metal and should be of a thickness that provides strength, yet is bendable to allow the second attachment plate 30 to be folded over at the fold line 22 into a position opposite the first attachment plate 24. The metal should also allow the locking tabs 26 to be folded over to capture the second attachment plate 30 after extending through a corresponding orifice 32. In one alternative embodiment, the locking tab 26 of one locking plate 14 may extend through, or engage, a notch in an opposing locking plate 14. The sheet metal allows the bracket 10 to be stamped out in one piece and then folded into the proper configuration, thus saving manufacturing costs.

Figure 3:
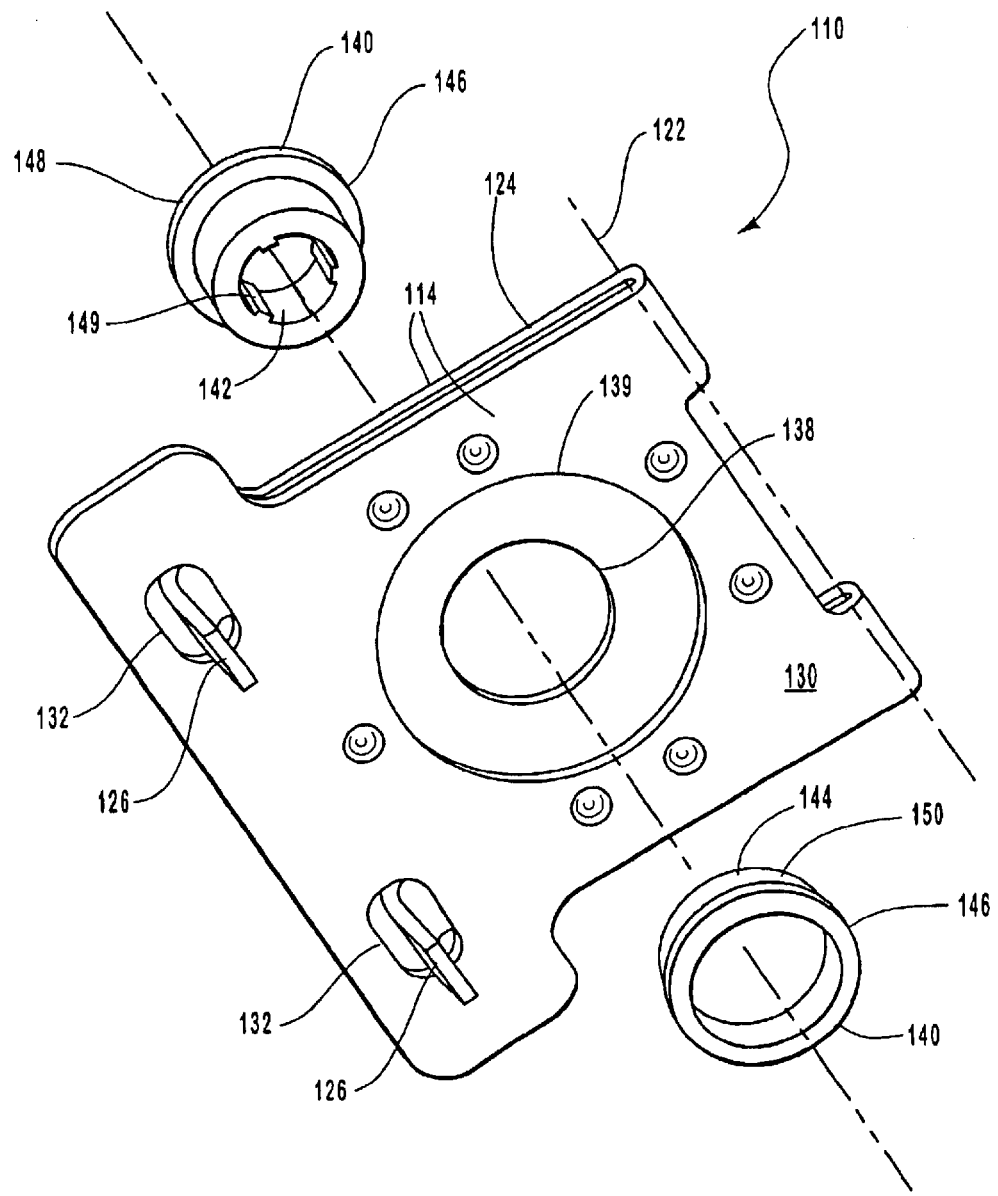
FIG. 3 is an alternative embodiment of a mounting bracket with a two-piece bushing.

Referring now to FIG. 3, an alternative embodiment of the bracket of the present invention is illustrated as 110. The bracket 110 includes a pair of attachment plates 114 configured to engage opposing surfaces of an inflatable curtain (not shown). The attachment plates 114 are connected to each other to from a unitary piece folded at a single fold line 122.

As with the embodiment described above, a first attachment plate 124 may include one or more locking tabs 126 which may extend through corresponding receiving orifices 132 configured within the second attachment plate 130. The locking tabs 126, when positioned within the receiving orifices 132 or notches (not shown), may be bent to secure an inflatable curtain within the mounting bracket 110. It will be appreciated by those of skill in the art that the attachment plates 114 may be configured to capture the inflatable curtain in a variety of ways, including, but not limited to latching, crimping, bonding, and the like.

The first and second locking plates 124, 130 each define a respective opening 138, 139. The openings 138, 139 may be substantially aligned to facilitate receiving a fastener (not shown) through the aligned openings 138, 139. At least one of the openings 138, 139 may be configured to receive a bushing 140. In one embodiment, the openings 138, 139 may be substantially the same size to allow the bushing 140 to engage both openings 138, 139.

The bushing may include an inner surface 142, an outer surface 144, and a pair of flanges 146, which extend radially from the outer surface 144 of the bushing 140. In the illustrated embodiment, the bushing 140 is a snap having a male member 148 and a female member 150. The male member 148 snaps within the female member 150 about the opening 138 and is retained there by the flanges 146 which are positioned on opposite sides of the opening 138 in the first attachment plate 124. It will be appreciated that in this embodiment, the bushing 140 need not be deformable to be press fit into position within the opening 138.

The outer surface 144 of the coupled bushing 140 is configured on the female member 150. The diameter of the outer surface 144 is smaller than the diameter of the opening 138 which allows the bushing 140 to freely rotate with the attachment plate 124. In another embodiment, the male member 148 may be freely rotatable within the female member 150. In this embodiment, the female member 150 may engage or be attached to one or more attachment plates 124, 130 while still allowing free rotation of a fastener positioned adjacent the inner surface 142 which is configured on the male member 148 of the snap. In both of these embodiments, torque from a fastener is prevented from transferring to the bracket 110.

As in the embodiment discussed above, the male member 148 may include one or more protrusions 149 which extend from the inner surface 142 to facilitate the attachment of a fastener to the bushing 140.

It will be appreciated by those of skill in the art that various snap configurations may be used to allow free rotation of a fastener within the bracket 110 while the fastener cinches the bracket 110 and the accompanying inflatable curtain onto an interior surface of a vehicle. Additionally the bushing 140 may include a first piece rotatably engaged to a second piece without the two pieces snapping together. For example, an annular or ring ball bearing system may be used to allow a first piece to freely rotate relative to a second piece. In this embodiment, free rotation of a fastener relative to the bracket 110 may be accomplished because the bushing 140 freely rotates within the bracket 110. Free rotation may also be achieved because of the rotational relationship of the multiple bushing pieces which allows one piece to be attached to the bracket 110 and another piece to be attached to a fastener.

Figure 4:
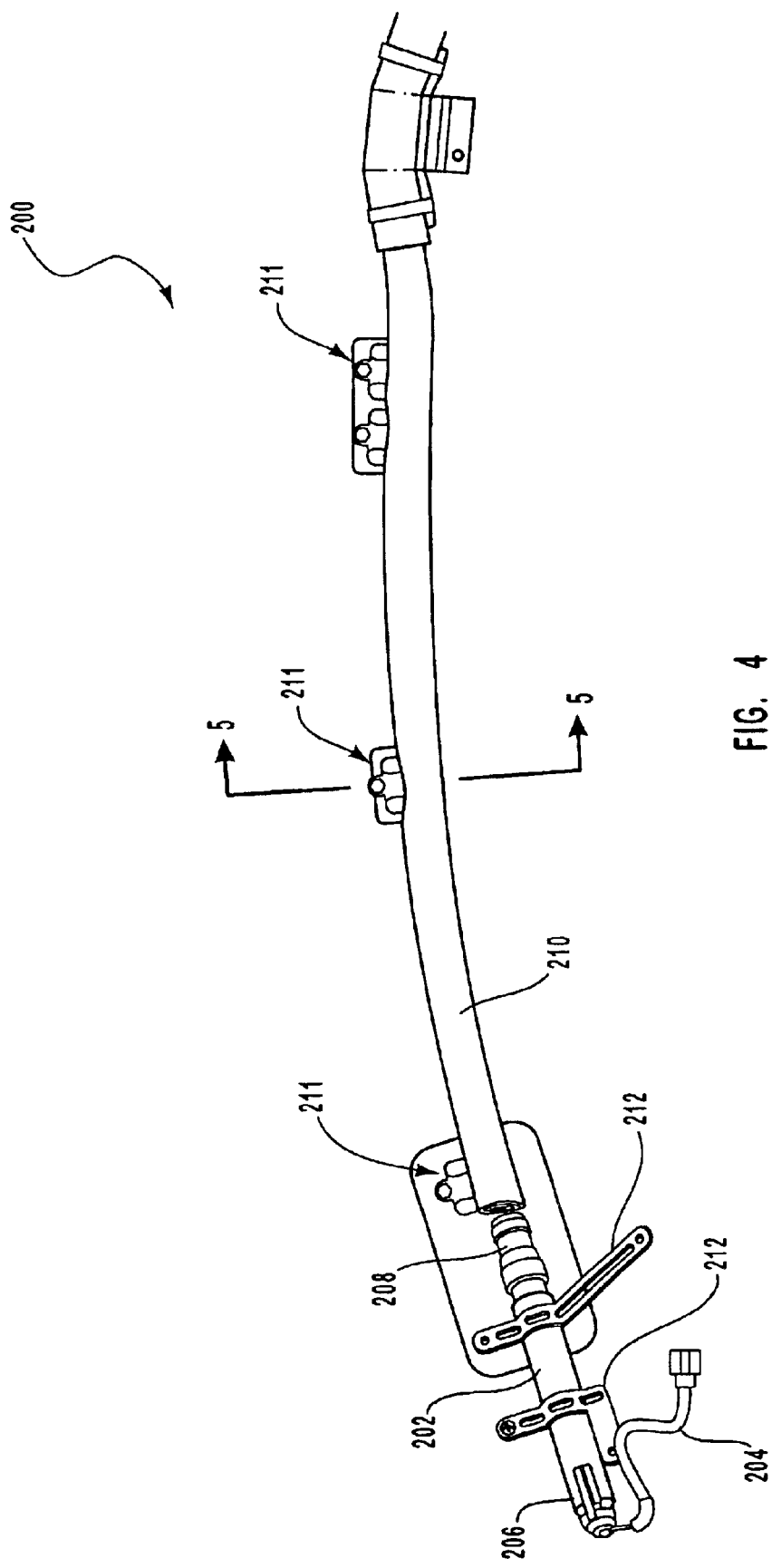
FIG. 4 is a side plane view of a mounting bracket shown with an inflatable airbag system.

Referring now to FIG. 4 an inflatable curtain or airbag device 200 is shown. The device includes an inflator 202 with an initiator device 204, such as a lead wire, attached at a first end 206 of the inflator 202. A second end 208 of the inflator 202 is in communication with an inflatable curtain 210 in a folded state. Brackets 212 may secure the inflator 202 to the interior of a vehicle. Mounting brackets 211 of the kind discussed previously may secure the inflatable curtain 210 to the interior of a vehicle. The mounting brackets 211 allow the inflatable curtain 210 to be secured to the vehicle by a fastener positioned within the brackets 211 while significantly reducing any torque exerted on the fastener during installation to be transferred to the brackets 211 or inflatable curtain 210.

Figure 5:
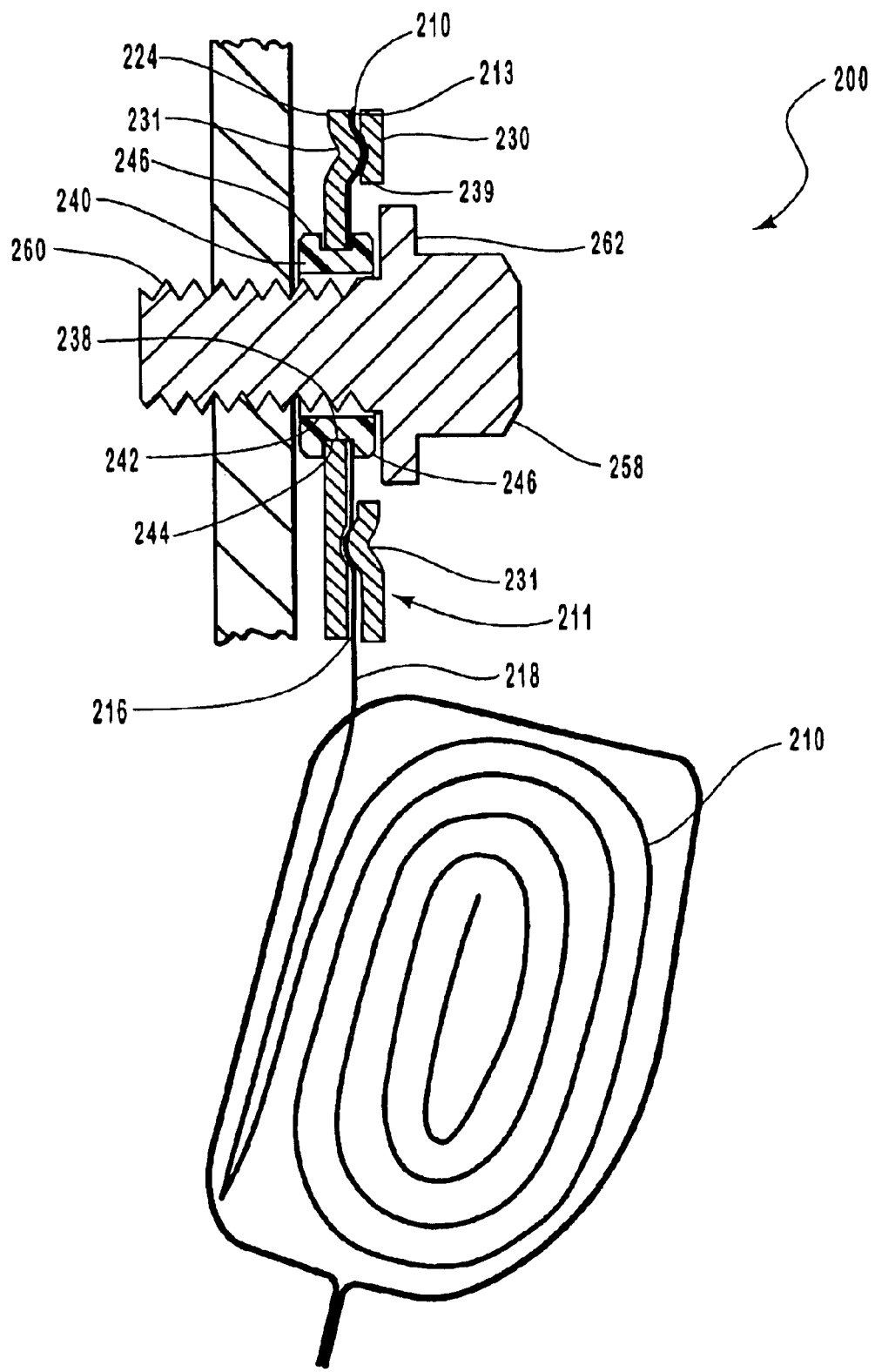
FIG. 5 is a side cutaway view of the airbag system of FIG. 4.

Referring now to FIG. 5, the airbag device 200 may include an inflatable curtain 210 having a first edge 213 and opposing surfaces 216 and 218. A pair of attachment plates 224 and 230 are configured to engage the opposing surfaces 216 and 218 of the inflatable curtain 210. In the illustrated embodiment, the attachment plates 224, 230 are configured with indentations 231 to facilitate the capture of the inflatable curtain 210 between the plates 224, 230.

The first and second locking plates 224, 230 each define a respective opening 238, 239 that may be substantially aligned to facilitate receiving a fastener 258. The inflatable curtain may also include an orifice which is aligned with the openings 238, 239 to receive the fastener 258 therethrough. At least one of the openings 238, 239 may be configured to receive a bushing 240. The bushing 240 may have an inner surface 242 and an outer surface 244. The bushing 240 is configured to be positioned within the opening 238 and in rotatable communication with at least one of the attachment plates 224, 230. As discussed in conjunction with the embodiments described above, the bushing 240 may include one or more flanges 246 extending radially from the outer surface 244 of the bushing 240 to facilitate retention of the bushing 240 within the opening 238 in the attachment plate.

The bushing 240 may be configured to receive the fastener 258. The fastener 258 may be configured with threads 260 to facilitate attachment of the inflatable curtain device 200 to the interior of a vehicle. The fastener 258 includes a head 262 which is larger than the diameter of the inner surface 242 of the bushing 240. This allows the fastener 258 to retain mounting bracket 211 in close proximity to the interior of the vehicle.

As discussed above, various embodiments of the attachment plates 224, 230, bushing 240, and fastener 258 may be utilized in various combinations in connection with the inflatable curtain to form a novel inflatable curtain or airbag device.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A mounting bracket for an inflatable curtain, comprising:
    first and second attachment plates for engaging the inflatable curtain, each plate engagable with a respective opposing surface of the inflatable curtain, at least one attachment plate defining an opening, wherein a first attachment plate comprises a locking tab extending from an attachment surface of the first attachment plate; and
    a bushing having an inner surface and an outer surface, the bushing in rotatable communication with the attachment plate adjacent the opening, the bushing configured to receive a fastener.

2. The mounting bracket of claim 1, wherein the outer surface of the bushing comprises a diameter smaller than the opening of at least one attachment plate.

3. The mounting bracket of claim 1, wherein the bushing is deformable to facilitate positioning of the bushing within the opening.

4. The mounting bracket of claim 1, wherein the bushing comprises a protrusion positioned at the inner surface to facilitate engagement of a fastener with the bushing.

5. The mounting bracket of claim 1, wherein the bushing further comprises a flange extending radially from the outer surface of the bushing to facilitate retention of the bushing within the opening in at least one attachment plate.

6. The mounting bracket of claim 1, wherein the bushing comprises a first piece rotatably engaged to a second piece.

7. The mounting bracket of claim 6, wherein the first piece is attached to at least one attachment plate.

8. The mounting bracket of claim 6, wherein the second piece is attached to a fastener.

9. The mounting bracket of claim 1, wherein the bushing comprises a snap having a male member and a female member.

10. The mounting bracket of claim 9, wherein the female member rotatably engages at least one attachment plate at the opening.

11. The mounting bracket of claim 9, wherein the male member comprises a protrusion positioned to facilitate engagement of a fastener with the bushing.

12. The mounting bracket of claim 1, wherein each plate defines an opening, the opening of each plate being substantially aligned with each other to permit the positioning of a fastener within each opening.

13. The mounting bracket of claim 1, wherein the bushing is positioned within at least one attachment plate.

14. The mounting bracket of claim 1, wherein the second attachment plate comprises a receiving orifice configured within the second attachment plate for receiving the locking tab.

15. The mounting bracket of claim 1, wherein the second attachment plate comprises a receiving notch configured within the second attachment plate for receiving the locking tab.

16. The mounting bracket of claim 1, wherein the attachment plates each comprise a first edge, the first edge of each attachment plate being connected to each other.

17. The mounting bracket of claim 16, wherein the first edge of each attachment plate is integral with each other.

18. The mounting bracket of claim 1, further comprising a fastener attached to the inner surface of the bushing.

19. The mounting bracket of claim 1, wherein the bracket is shaped to receive a fastener having a head which is larger than a diameter of the inner surface of the bushing.

20. A mounting bracket for an inflatable curtain, comprising:
    first and second attachment plates for engaging the inflatable curtain, each plate configured to engage a respective opposing surface of an inflatable curtain, at least one plate defining an opening, to permit the positioning of a fastener within the opening, wherein the first attachment plate comprises a locking tab extending from an attachment surface of the first attachment plate; and
    a bushing having an inner surface and an outer surface, the bushing in rotatable communication with at least one attachment plate adjacent the bushing configured to receive a fastener, the bushing comprising a flange extending radially from the outer surface of the bushing to facilitate retention of the bushing within the opening in the attachment plate.

21. The mounting bracket of claim 20, wherein the outer surface of the bushing comprises a diameter smaller than the opening of at least one attachment plate.

22. The mounting bracket of claim 21, wherein the bushing is deformable to facilitate positioning of the bushing within the opening.

23. The mounting bracket of claim 22, wherein the bushing comprises a protrusion positioned at the inner surface to facilitate engagement of a fastener with the bushing.

24. The mounting bracket of claim 20, wherein the second attachment plate comprises a receiving orifice configured within the second attachment plate for receiving the locking tab.

25. The mounting bracket of claim 24, further comprising a fastener attached to the inner surface of the bushing.

26. The mounting bracket of claim 24, wherein the bracket is shaped to receive a fastener having a head which is larger than a diameter of the inner surface of the bushing.

27. The mounting bracket of claim 20, wherein the second attachment plate comprises a notch configured within the second attachment plate for receiving the locking tab.

28. The mounting bracket of claim 20, wherein the bushing comprises a first piece rotatably engaged to a second piece.

29. The mounting bracket of claim 28, wherein the first piece is attached to the attachment plate.

30. The mounting bracket of claim 29, further comprising a fastener attached to the second piece.

31. The mounting bracket of claim 30, wherein the second attachment plate comprises a receiving orifice configured within an attachment surface of the second attachment plate for receiving the locking tab.

32. The mounting bracket of claim 29, wherein the bracket is shaped to receive a fastener having a head which is larger than a diameter of the inner surface of the bushing.

33. The mounting bracket of claim 20, wherein the bushing comprises a snap having a male member and a female member.

34. The mounting bracket of claim 33, wherein the female member rotatably engages the attachment plate at the opening.

35. The mounting bracket of claim 34, wherein the male member comprises a protrusion positioned to facilitate engagement of a fastener with the bushing.

36. The mounting bracket of claim 35, wherein the second attachment plate comprises a receiving orifice configured within an attachment surface of the second attachment plate for receiving the locking tab.

37. The mounting bracket of claim 36, further comprising a fastener attached to the inner surface of the bushing.

38. The mounting bracket of claim 36, wherein the bracket is shaped to receive a fastener having a head which is larger than a diameter of the inner surface of the bushing.

39. The mounting bracket of claim 20, wherein the attachment plates each comprise a first edge, the first edge of each attachment plate being connected to each other.

40. The mounting bracket of claim 39, wherein the first edge of each attachment plate is integral with each other.

41. A mounting bracket for an inflatable curtain, comprising:
   a first and second attachment plate, each configured to engage a respective opposing surface of an inflatable curtain, each plate further defining an opening, the opening of each plate being substantially aligned with each other to permit the positioning of a fastener within each opening, the pair of attachment plates being attached to each other at a first edge of each attachment plate; and
   a deformable bushing having an inner surface and an outer surface, the outer surface of the bushing comprising a diameter smaller than the opening of the attachment plate, the bushing being in rotatable communication with the attachment plate adjacent the opening;
   a locking tab extending from an attachment surface of the first attachment plate; and
   a receiving orifice configured within an attachment surface of the second attachment plate for receiving the locking tab.

42. An airbag device, comprising:
   an inflatable curtain having a first edge and opposing surfaces;
   first and second attachment plates configured to engage a respective opposing surface of the inflatable curtain, at least one attachment plate defining an opening to facilitate receiving a fastener, wherein the first attachment plate comprises a locking tab extending from an attachment surface of the first attachment plate; and
   a bushing having an inner surface and an outer surface, the bushing being positioned within the opening and in rotatable communication with at least one attachment plate, the bushing comprising a flange extending radially from the outer surface of the bushing to facilitate retention of the bushing within the opening in the attachment plate.

43. A mounting bracket for an inflatable curtain, comprising:
   an attachment means for clamping a portion of the inflatable curtain, the attachment means defining an opening;
   a locking means for securing the inflatable curtain to the attachment means, the locking means including a locking tab extending from at least one portion of the attachment means; and
   a free rotation means for receiving a fastener and being in rotatable communication with the attachment means adjacent the opening, the free rotation means having an inner surface and an outer surface.

44. The mounting bracket of claim 43, wherein the free rotation means comprises a fastener engagement means positioned at the inner surface for frictionally engaging a fastener within the free rotation means.

45. The mounting bracket of claim 43, wherein the attachment means clamps a respective opposing surface of the inflatable curtain.

* * * * *